United States Patent
Spiekermann

(10) Patent No.: US 9,570,882 B2
(45) Date of Patent: Feb. 14, 2017

(54) MOPA WITH EXTERNALLY TRIGGERED PASSIVELY Q-SWITCHED LASER

(71) Applicant: Coherent GmbH, Göttingen (DE)

(72) Inventor: Stefan Spiekermann, Hannover (DE)

(73) Assignee: Coherent LaserSystems GmbH & Co. KG, Göttingen (DE)

( * ) Notice: Subject to any disclaimer, the term of this patent is extended or adjusted under 35 U.S.C. 154(b) by 970 days.

(21) Appl. No.: 13/851,275

(22) Filed: Mar. 27, 2013

(65) Prior Publication Data

US 2016/0276801 A1    Sep. 22, 2016

(51) Int. Cl.
| | |
|---|---|
| H01S 3/23 | (2006.01) |
| H01S 3/0941 | (2006.01) |
| H01S 3/10 | (2006.01) |
| H01S 3/102 | (2006.01) |
| H01S 3/113 | (2006.01) |
| H01S 3/16 | (2006.01) |
| H01S 3/107 | (2006.01) |
| H01S 3/11 | (2006.01) |
| H01S 3/094 | (2006.01) |
| H01S 3/00 | (2006.01) |

(52) U.S. Cl.
CPC ......... *H01S 3/2308* (2013.01); *H01S 3/09415* (2013.01); *H01S 3/094038* (2013.01); *H01S 3/107* (2013.01); *H01S 3/1022* (2013.01); *H01S 3/10084* (2013.01); *H01S 3/11* (2013.01); *H01S 3/113* (2013.01); *H01S 3/1611* (2013.01); *H01S 3/1673* (2013.01); *H01S 3/005* (2013.01); *H01S 3/0078* (2013.01); *H01S 3/094076* (2013.01); *H01S 3/10046* (2013.01); *H01S 2301/02* (2013.01)

(58) Field of Classification Search
CPC .... H01S 3/094088; H01S 3/1024; H01S 3/11; H01S 3/127; H01S 3/2308; H01S 3/0915; H01S 3/1112; H01S 3/094076; H01S 3/10046
See application file for complete search history.

(56) References Cited

U.S. PATENT DOCUMENTS

| | | | |
|---|---|---|---|
| 4,056,290 A * | 11/1977 | Bobb | ........................ G02F 1/37 |
| | | | 359/327 |
| 6,553,052 B1 * | 4/2003 | Ireland | ................ H01S 3/09415 |
| | | | 372/69 |
| 6,885,683 B1 | 4/2005 | Fermann et al. | |
| 7,233,607 B2 | 6/2007 | Richardson et al. | |
| 7,256,931 B2 | 8/2007 | Damzen | |
| 2003/0138005 A1 * | 7/2003 | Kan | ........................ H01S 3/113 |
| | | | 372/25 |

(Continued)

OTHER PUBLICATIONS

International Search Report and Written Opinion received for PCT Patent Application No. PCT/EP2014/055771, mailed on May 27, 2014, 13 pages.

(Continued)

*Primary Examiner* — Yuanda Zhang
*Assistant Examiner* — Michael Carter
(74) *Attorney, Agent, or Firm* — Morrison & Foerster LLP

(57) ABSTRACT

In a master oscillator plus power amplifier (MOPA) system, the oscillator is a passively Q-switched laser. The laser is triggered into passively Q-switched operation by operating an optical switch to resonantly couple back into the laser amplified stimulated emission generated by the amplifier.

12 Claims, 4 Drawing Sheets

(56) References Cited

U.S. PATENT DOCUMENTS

| | | | |
|---|---|---|---|
| 2007/0263677 A1* | 11/2007 | Tanaka | H01S 3/117 372/17 |
| 2009/0059967 A1* | 3/2009 | Chiang | G02F 1/292 372/12 |
| 2011/0069376 A1 | 3/2011 | Diening | |
| 2011/0243158 A1* | 10/2011 | Spiekermann | H01S 3/0627 372/11 |
| 2011/0310468 A1 | 12/2011 | Hertwig et al. | |

OTHER PUBLICATIONS

Khurgin et al., "Timing Jitter Reduction in Diode Pumped Passively Q-Switched Laser with Composite Pumping Pulses", Conference on Lasers and Electro-Optics. (cleo 2001) Technical digest. Postconference edition. Baltimore, MD, vol. 56, May 6, 2001, pp. 532-533.

* cited by examiner

MOPA WITH EXTERNALLY TRIGGERED PASSIVELY Q-SWITCHED LASER

TECHNICAL FIELD OF THE INVENTION

The present invention relates in general to laser processing using a master oscillator power amplifier (MOPA) apparatus including a passively Q-switched laser arranged to provide a train of pulses at some predetermined pulse-repetition period (PRP). The invention relates in particular to methods for delivering from such the apparatus individual pulses having an arbitrary temporal separation therebetween, bursts of pulses having the desired PRP between pulses in the burst, or a train of pulses having a PRP different from that of the passively Q-switched laser.

DISCUSSION OF BACKGROUND ART

Passively Q-switched microchip lasers (MCLs) have been demonstrated as a promising concept for realizing compact laser-sources for various applications. MCLs employing neodymium doped yttrium vanadate ($Nd:YVO_4$) as a solid-state gain medium and passively Q-switched by a semiconductor saturable absorber mirror (SESAM) can generate pulses with durations in the 100 picosecond (ps) range with energies of several 100 nanojoules (nJ). One microchip laser suitable for use with this gain medium is described in detail in U.S. Pre-grant Publication No. 2011/0243158, the complete disclosure of which is hereby incorporated herein by reference.

Such MCLs have inherently single longitudinal mode operation, due to the resonator length being short enough that only one lasing mode is possible within the gain-bandwidth of the gain-medium, and exhibit nearly diffraction-limited beam quality. This makes these MCLs potentially suitable for applications including spectroscopy, frequency conversion, micromachining, light detection and ranging (LIDAR), and precision medical and dental operations. Where additional power is required, the output of an MCL can be optically amplified creating a MOPA system with an MCL as master oscillator. One optical amplifier suitable for this purpose is described in U.S. Pat. No. 7,256,931, incorporated herein by reference. This amplifier is a compact, multi-pass, grazing-incidence amplifier employing a thin, relatively short slab of $Nd:YVO_4$, faced-pumped by a diode-laser array (diode-laser bar). The compact nature of the amplifier, in conjunction with the compact MCL provides for a correspondingly compact MOPA system.

In present such MOPA systems, the passively Q-switched MCL delivers a train of pulses at some PRF determined, inter alia, by properties of a saturable absorption element such as a semiconductor saturable absorption mirror (SESAM) providing the passive Q-switching, and optical pump power supplied to the solid-state gain-medium of the laser. The amplifier amplifies the pulse-train from the laser to provide a train of amplified pulses as the MOPA output.

In many applications for which such a MOPA is suitable, it can be an advantage to deliver individual pulses having an arbitrary temporal separation therebetween, bursts of pulses having the laser-PRP between pulses in the burst, or a train of pulses having a PRP significantly different from that of the passively Q-switched laser. In current such MOPA systems, this is typically accomplished by providing an electro-optical switch, such as an acousto-optic modulator or an electro-optic modulator inside the laser oscillator. Opening the switch on demand leads to the evolution of a giant-pulse. This switching scheme is so called "active Q-switching". Another approach is to place the switch at the MOPA (amplifier) output of a passively Q-switched MOPA. The switch is electronically triggered to pass a pulse or pulses as required, rejecting those pulses not required. Such a switch is often whimsically referred to as a "pulse picker" by practitioners of the art.

A problem presented by active Q-switching is that a relatively long laser-resonator is required to accommodate the Q-switch leading to longer pulses. In the passive Q-switched, modulated output approach, the rejected pulses must be contained in some way. This is usually accomplished by directing the rejected pulses into an absorbing "beam dump". This usually results in the generation of heat, which must be removed either by active or passive cooling means. Another disadvantage of this approach is that it is incompatible with generating pulses with arbitrary temporal separation. These problems could be avoided if a passively Q-switched laser were available that delivered pulses only on demand.

SUMMARY OF THE INVENTION

In one aspect, apparatus in accordance with the present invention comprises a passively Q-switched diode-pumped laser-resonator including a solid-state gain element for delivering laser pulses. A diode-pumped optical amplifier is provided for amplifying the laser pulses. The optical amplifier generates amplified stimulated emission (ASE) in response to the diode-pumping. An optical switch is located between the laser and the amplifier and is arranged for selectively allowing the amplified stimulated emission to be resonantly coupled into the laser-resonator.

In a preferred embodiment of the invention, the laser resonator is an above-referenced MCL resonator, which has a length selected such that only a single lasing mode is possible within a gain-bandwidth of the solid-state gain element. Resonantly coupling the ASE into the laser resonator has the functionality of an active Q-switch for causing the laser to deliver one or more pulses on demand. Such a resonator length would be too short to accommodate an active Q-switch.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
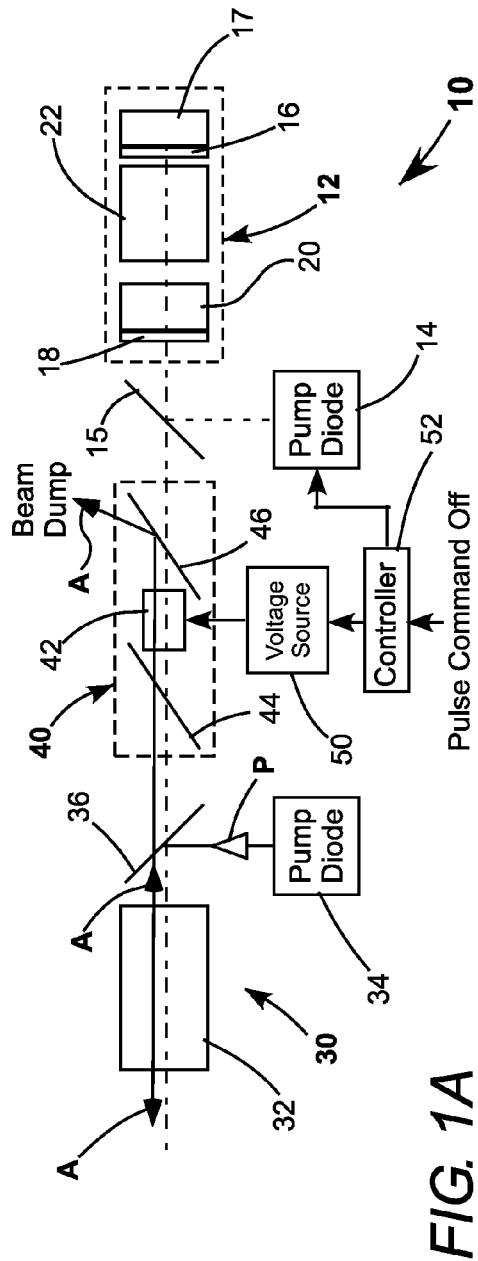
FIG. 1A schematically illustrates a preferred embodiment of a MOPA in accordance with the present invention including a passively Q-switched diode-pumped solid-state laser, a solid-state optical amplifier generating ASE and an optical switch between the laser and the amplifier, the laser being in a low Q factor state, the optical switch preventing ASE from the amplifier from entering the laser and with a controller arranged for opening or closing the optical switch, and for turning the diode-pumping on and off.
Figure 1B:
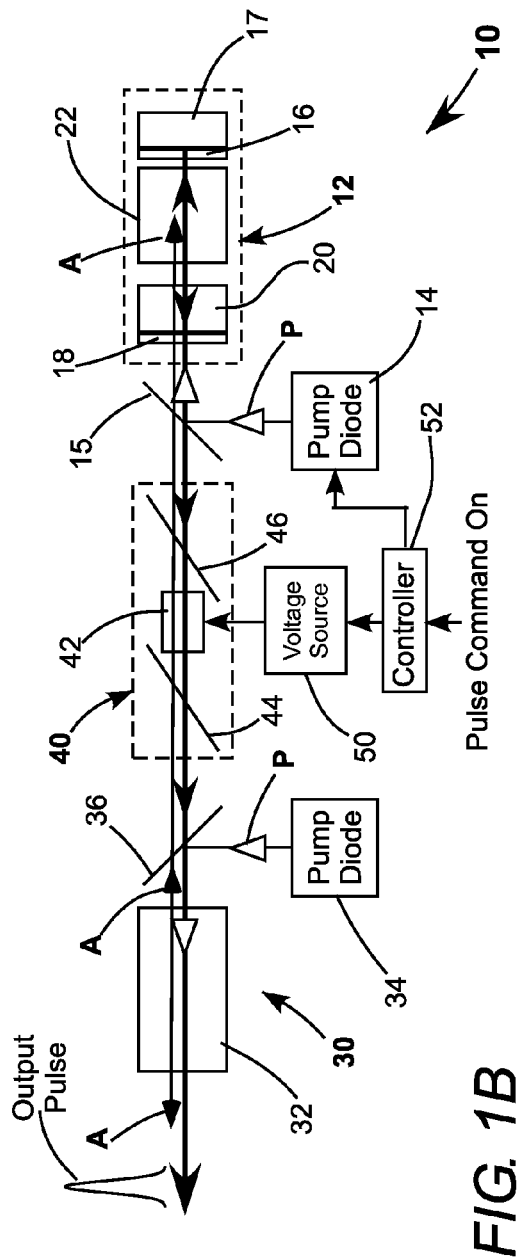
FIG. 1B schematically illustrates the MOPA of FIG. 1A with diode-laser turned on, and the optical switch allowing ASE from the amplifier to be resonantly coupled into the laser and increase the Q-factor such that the laser can deliver a passively Q-switched laser pulse in a time determined by the increased Q-factor.

Referring now to the drawings, wherein like components are designated by like reference numerals, FIG. 1A and FIG. 1B schematically illustrate a preferred embodiment 10 of a MOPA in accordance with the present invention. MOPA 10 includes a passively Q-switched laser 12, which is end-pumped by radiation, designated by open arrowheads P, from a diode-laser 14. Pump radiation is directed into the laser via a dichroic mirror 15, reflective for the pump-radiation wavelength and transmissive for the lasing wavelength. In the condition depicted in FIG. 1A, pump radiation is not being delivered to laser 12, i.e., pump-diode 14 is turned off.

Laser 12, here, has a laser resonator formed between a mirror 16 maximally reflecting at the lasing wavelength, and a mirror 18, partially reflecting and partially transmitting at the lasing wavelength for providing output coupling for the laser. In this embodiment, mirror 16 is a multilayer dielectric mirror coated on a substrate 17. Output coupling mirror 18 is a multilayer dielectric mirror coated on a saturable absorber element 20. The saturable absorption provides for passive Q-switching of the laser. For purposes of this description, it is assumed that a resonator axis 24 of laser 14 defines a system axis for MOPA 10.

A solid-state gain-element 22 is located in the laser resonator between mirror 18 and saturable absorber element 20. A suitable gain medium for gain-element 22 is neodymium-doped yttrium orthovanadate (Nd:YVO$_4$). A suitable material for saturable absorber element 20 is chromium-doped yttrium aluminum garnet (Cr:YAG). In one alternate arrangement for laser 12, element 20 could be omitted and dielectric mirror 12 replaced by a SESAM to provide the saturable absorption required for Q-switching.

Whatever the laser arrangement and choice of saturable absorber, the transmission value of output coupling mirror 18, and the modulation depth of the saturable absorber, are selected cooperative with the length and doping percentage of gain-element 22, such that the laser resonator will, absent any outside influence, have a free-running PRF at least 5% less than the lowest PRF which will be required for pulses generated on demand. By way of example, an MCL laser-resonator having a 1% doped Nd:YVO$_4$ gain crystal with a length of 200 micrometers (μm), an output-coupling mirror reflectivity of about 90%, and a saturable absorber with a modulation depth of about 10% will generate a free-running pulse train having a PRF of approximately 50 kilohertz (kHz) when pumped with a pump-radiation power of about 400 milliwatts (mw). In FIG. 1A, laser 12 is depicted with the pump-diode turned off in a non-lasing condition.

MOPA 10 includes an optical amplifier 30 including a solid-state gain-element 32 which is end-pumped by radiation, designated by open arrowheads P, from a diode-laser 34. Pump-radiation is directed into the laser via a dichroic mirror 36, reflective for the pump-radiation wavelength and transmissive for the lasing wavelength. In FIGS. 1A and 1B it assumed that the amplifier is continuously pumped when the MOPA is in use. Gain-element 32 is preferably of the same material as gain-element 22 of laser 12, or at least of a material that has a peak-gain corresponding to the lasing wavelength.

Between laser 12 and amplifier 30 is an optical switch 40, here, formed by a Pockels cell 42 located between multilayer dielectric reflective polarizer elements 44 and 46. Selectively variable operating voltage is applied to the Pockels cell by a voltage source (power supply) 50. Voltage source 50 is operated by a controller 52 in response to externally provided demands for pulses. Controller 52 also is arranged to turn pump-diode 14 on or off in response to those commands.

As depicted in FIG. 1A, when no pulse is being demanded and pump-diode 14 is off, a particular voltage applied to the Pockels cell causes the polarization plane of radiation passed by polarizer element 44 to be rotated by 90° such that radiation is reflected away from system axis 24 by polarizer element 46, to be captured by a beam-dump or the like (not explicitly shown). As depicted in FIG. 1B, in response to a demand for a pulse, controller 52 causes a different particular trigger voltage to be applied by voltage source 50 to the Pockels cell, which, in turn, causes the polarization plane of radiation passed by polarizer element 44 to be rotated by either zero degrees, or some whole multiple of 180°. This provides that the radiation passed by polarizer element 44 is also passed by polarizer element 46. Those skilled in the art will recognize that one of the particular applied voltages can be optionally zero, depending on the Pockels cell configuration. In response to the demand for a pulse, controller 50 turns pump-diode 14 on and pump-radiation P is delivered to laser 12.

In response to the continuous optical pumping by radiation from diode-laser 34, gain-element 32 of amplifier 30 generates amplified stimulated emission (ASE) in a wavelength band about the peak-gain wavelength of the gain-element. ASE is designated in FIGS. 1A and 1B by small arrowheads A. In FIGS. 1A and 1B, the ASE propagation is designated by a fine solid line slightly displaced from system axis 24 for convenience of illustration. In practice, of course, the ASE propagation will be coaxial along system axis 24, along which pump-radiation is directed, and, periodically, along which laser pulses are directed for amplification by the gain-medium.

In FIG. 1A, laser 12, not being optically pumped, is not delivering laser radiation. In FIG. 1B when pump diode 14 is switched on by controller 52, pump radiation P is delivered by the laser and the process of providing a free-running passively Q-switched pulse begins at the characteristic low PRF. When optical switch 40 is switched to allow passage of ASE from amplifier 30, the ASE is resonantly coupled into laser 12.

The resonant coupling can be understood by considering that the laser resonator is effectively a Fabry-Perot etalon with a center wavelength at the lasing wavelength. The ASE wavelength being essentially the same as the lasing wavelength means that the coupling is resonant and the ASE coupled in forms a standing wave in the laser resonator in the same way as the laser radiation forms a standing wave. This ASE standing wave reinforces the laser radiation standing wave and effectively increases the Q-factor of the laser resonator and lowers the lasing threshold thereby creating a seeded PRF higher than the unseeded (spontaneous) PRF. This increased Q-factor accordingly accelerates the generation of a pulse by the laser. This causes an externally-triggered pulse to be delivered before a non-triggered (spontaneously generated) pulse would have been delivered in response to simply turning on the optical pumping.

If switch 40 is left open with diode-pumping continued a train of pulses is generated at the seeded characteristic PRF until the pump-diode is turned off. At this point the ASE can also be turned off to reset the MOPA system to no output until a new demand for a pulse or train thereof is received by the controller. Laser-radiation propagates as indicated in FIG. 1B by a bold solid line. The propagation direction is indicated by large solid arrowheads L.

Laser 12 is depicted in the form of a very short cavity MCL similar to the type described in above referenced Pre-grant Publication No. 2011/01243158. Such a MCL can be made to operate by passive-Q-switching at a PRF of between from a few kilohertz (kHz), to over 1 megahertz (MHz) Even at the higher PRF, an optical switch either of the Pockels cell (electro-optical) type or an acousto-optical (AO) switch can be switched sufficiently quickly that laser 12 could be triggered to deliver pulses on demand. Accordingly, MOPA 10 is capable of delivering, on demand, a single pulse, bursts of a few pulses per burst, or an extended train of pulses. The only limitation of the maximum PRF on demand is the characteristic PRF of the free running MCL absent outside influence.

The functionality of the ASE feedback trigger is the same as that of an integrated (intra-resonator) active Q-switch. An important advantage, however, is that with the inventive ASE feedback trigger, the laser resonator does not need to be extended to accommodate an active Q-switch. This means that the MCL can remain short enough for single-mode selection as discussed above, and for minimizing pulse-duration.

It should be noted here that end-pumping of amplifier 30 is preferred in the present invention for reasons as follows. In gain-element 32, ASE will be generated co-axially (co-directionally) with the pump-radiation beam, and, accordingly, will have a relatively low divergence. This ensures that sufficient ASE can be fed back to laser 12 to provide the seeding required for reducing the lasing threshold. Those skilled in the art will recognize, without detailed description of further illustration, that a fiber-amplifier would also provide the required directionality of the ASE. In a side-pumped or face-pumped gain-element, ASE may not have the same directionality and low divergence, and additional optical arrangements may be necessary to provide sufficient ASE feed-back.

In certain configurations, optical switch 40 can be used for wavelength locking passively Q-switched pulses from laser 12. The material of Pockels cell 44 can have a static birefringence (different refractive index along two crystal axes) and a length sufficient that the optical switch behaves as a one-element Lyot filter with a free spectral range greater than the gain-bandwidth of the gain-medium of a laser. The crystal can be temperature tuned such that one pass-band falls within the gain-bandwidth and the lasing wavelength. ASE traversing the optical switch will be spectrally filtered by the optical switch. The laser, being seeded by the spectrally filtered ASE, will operate only at that filtered wavelength. By way of example, a rubidium titanyl phosphate (RTP) crystal having a length of about 10 mm will have a free spectral range of 3.8 nm and a FWHM pass-band width of about 1.9 nm.

The present invention is described above with reference to one preferred embodiment of the inventive MOPA apparatus. The description of the invention is recapitulated below in terms of system dynamics, with reference to a timing diagram comprising the graphs of FIG. 2A, FIG. 2B, FIG. 2C, FIG. 2D and FIG. 2E. It is assumed here that amplifier 30 is being continuously pumped.

Figure 2A:
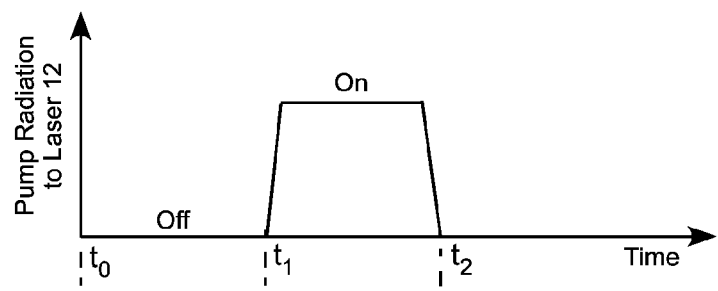
FIG. 2A, FIG. 2B, FIG. 2C, FIG. 2D, and FIG. 2E are graphs forming a timing diagram schematically illustrating an operating mode of the apparatus of FIGS. 1A and 1B for generating a single pulse on demand by modulating the diode-pumping and the ASE coupling into the laser.
Figure 2B:
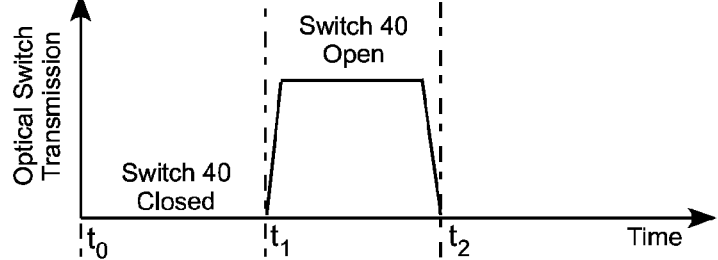

FIG. 2B schematically depicts the state of optical switch 40, which at time $t_0$ is in a closed sate, not transmitting, and thereby preventing backward-propagating ASE from amplifier 40 from reaching laser 12, (see FIG. 2B). Pump-diode 14 is turned off (see FIG. 2A) and, accordingly, laser 12 is not delivering laser radiation (see FIG. 2E). Laser 12 is set at the unseeded low Q-factor (see FIG. 2D).

Figure 2C:
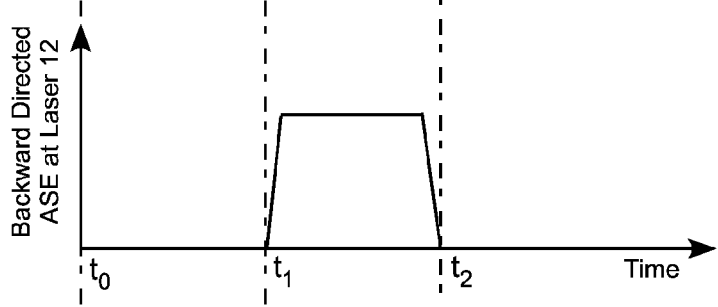
Figure 2D:
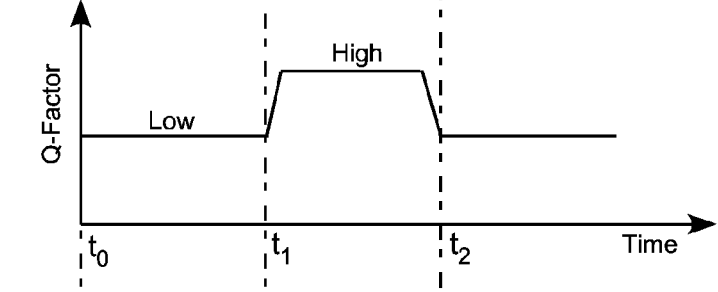
Figure 2E:
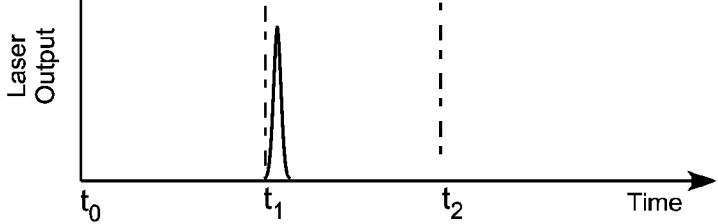
Figure 3A:
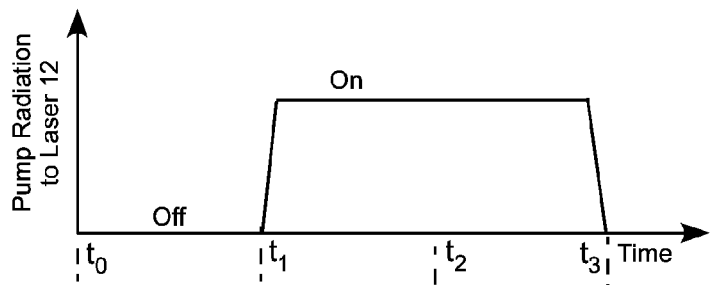
FIG. 3A, FIG. 3B, FIG. 3C, FIG. 3D, and FIG. 3E are graphs forming a timing diagram schematically illustrating an operating mode of the apparatus of FIGS. 1A and 1B similar to the operating mode of FIGS. 2A-E but for generating a burst of two pulses on demand.
Figure 3B:
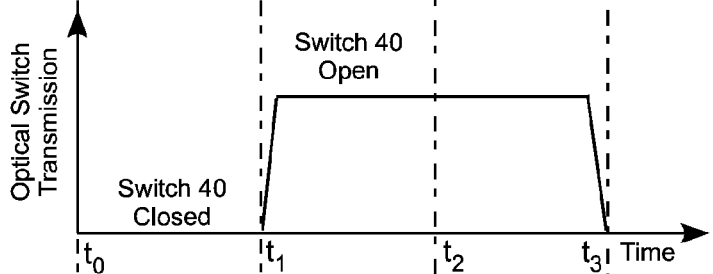
Figure 3C:
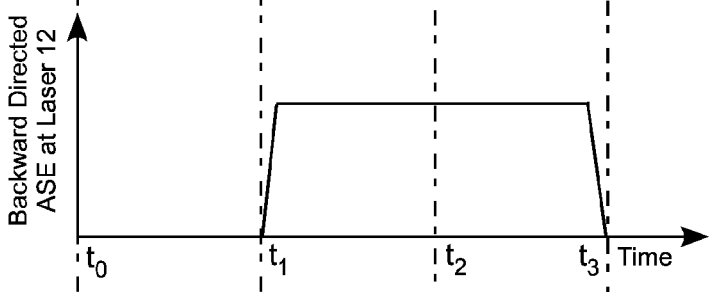
Figure 3D:
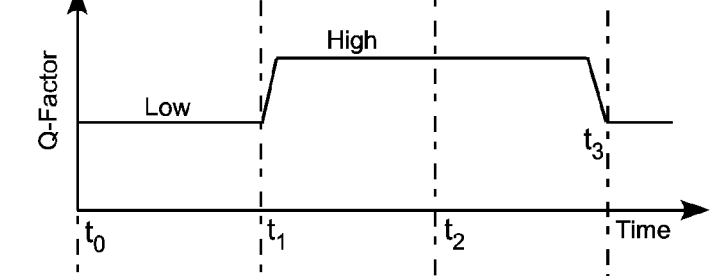
Figure 3E:
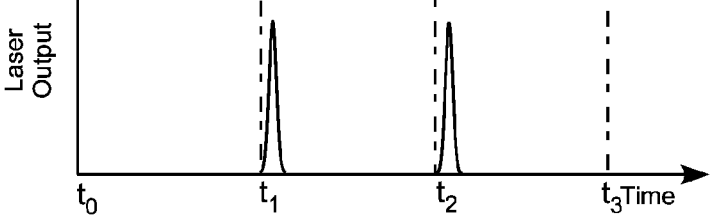
Figure 4A:
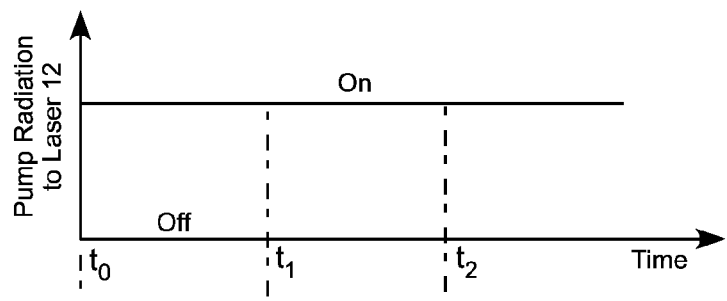
FIG. 4A, FIG. 4B, FIG. 4C, FIG. 4D, and FIG. 4E are graphs forming a timing diagram schematically illustrating an operating mode of the apparatus of FIGS. 1A and 1B similar to the operating mode of FIGS. 2A-E but wherein only the ASE coupling is modulated.
Figure 4B:
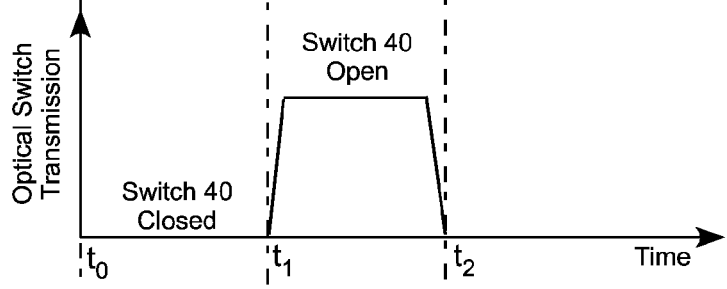
Figure 4C:
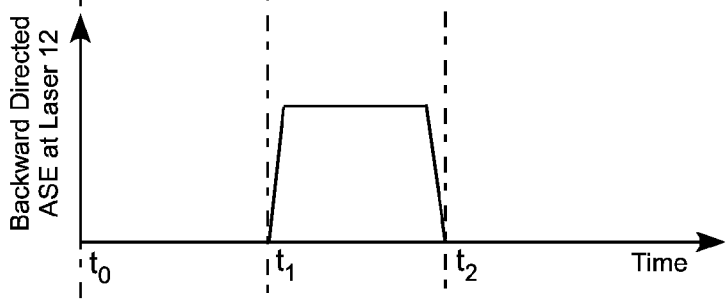
Figure 4D:
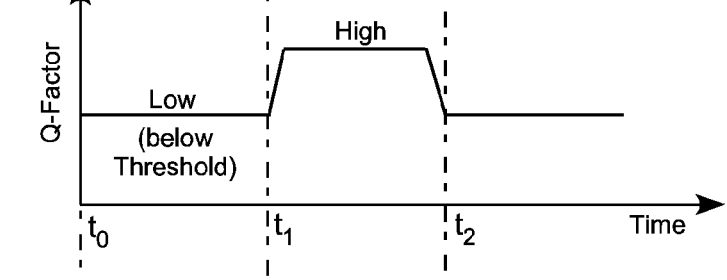
Figure 4E:
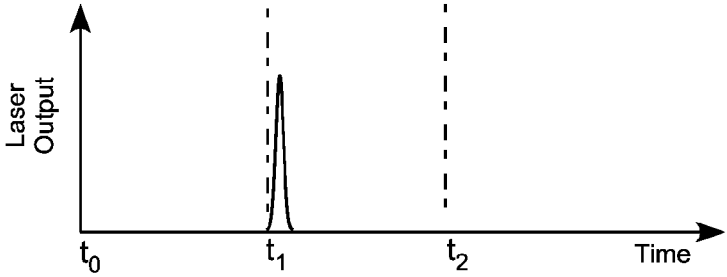

At time $t_1$, optical switch 40 is switched to an open, transmitting, state (see FIG. 2B), which allows the backward-propagating ASE to be resonantly coupled into laser 12 (see FIG. 2C). Pump-diode 14 is turned on (see FIG. 2A). The coupled ASE increases the effective Q-Factor of the laser to a level which allows resonant build-up to occur in the laser resonator faster than would be the case in the absence of the resonantly coupled ASE, i.e., at the lower Q-factor. The ASE-triggered (reinforced) resonant build-up saturates absorber 20 and causes the laser to deliver an optical pulse (see FIG. 2E). In this example, diode-laser 14 is turned off at a time $t_2$ (see FIG. 2A) de-energizing the laser before another pulse can be generated at the higher Q-Factor, i.e., at the seeded PRF. Optionally switch 40 can then be closed (see FIG. 2B) lowering the Q-factor prior to controller 52 receiving another pulse command.

As noted above, the single-pulse delivery depicted by FIGS. 2A-D is but one mode of operating inventive MOPA 10. An operating mode for providing a train of pulses on demand is graphically depicted by FIGS. 3A, 3B, 3C, 3D, and 3E. This operating mode is similar to the operating mode of FIGS. 2A-E with an exception that after the pump-power and ASE feedback are turned on at time $t_1$, the pump-power is allowed to remain on until a time $t_3$, with the difference between time $t_3$ and $t_1$ being sufficiently long to allow another pulse to be generated in a time determined by the higher effective Q-factor. Here again, ASE feedback is turned off when the pump-power is turned off, lowering the Q-factor of the laser prior to controller 52 receiving another pulse command.

Clearly, while only a burst of two pulses is depicted in FIGS. 3A-E, three or more pulses can be generated, albeit with the same interval between any two successive pulses. A train of pulses with arbitrary separation, beyond some lower limit imposed by the seeded PRF, can be generated by repeating the single-pulse operation sequence of FIGS. 2A-E modulating both the pump diode and the optical switch.

In another operating mode of the apparatus of FIGS. 1A and 1B, the Q-factor of the laser can be set sufficiently low that, without ASE feedback, the laser cannot spontaneously generate pulses when pumped by diode-laser, i.e., the laser is below threshold at the pump power. This below threshold-condition could be created in the above example of a laser configuration by appropriately lowering the output coupler reflectivity, increasing the modulation depth of the saturable absorber, or lowering the diode-laser pump-radiation power.

With ASE feedback, the Q-factor is increased to allow pulses to be generated (laser pumped above threshold). In this mode, the pump-diode 14 can be left on, and pulses generated simply by modulating the ASE feedback coupling using only optical switch 40.

By way of example, FIG. 4A, FIG. 4B, FIG. 4C, FIGS. 4D, and 4E are graphs forming a timing diagram schematically illustrating an operating mode of the apparatus of FIGS. 1A and 1B similar to the operating mode of FIGS. 2A-E but wherein only the ASE coupling is modulated. As can be seen from FIG. 4A pump-radiation is delivered continuously to the laser, but pulse generation is only possible with the resonantly coupled ASE feedback. Those skilled in the art will recognize without further detailed description of illustration that the operating mode of FIGS. 4A-E could be practiced with such a below threshold laser, and an arbitrary pulse train could be generated by repeating the operation of FIGS. 4A-E modulating only the ASE feedback.

In summary, the present invention is described above with reference to a preferred and other embodiments. The invention, however, is not limited to the embodiments described and depicted herein. Rather, the invention is limited only by the claims appended hereto.

What is claimed is:

1. Optical apparatus, comprising:
   a passively Q-switched diode-pumped laser-resonator including a solid-state gain-element for delivering laser pulses;
   a diode-pumped optical amplifier for amplifying the laser pulses, the optical amplifier generating amplified stimulated emission in response to the diode-pumping; and
   an optical switch located between the laser and the amplifier and arranged for selectively allowing the amplified stimulated emission to be resonantly coupled into the laser-resonator to seed the laser-resonator to cause a laser pulse to be delivered sooner than if the laser-resonator was not seeded.

2. The apparatus of claim 1 wherein the laser resonator has a length selected such that only a single lasing mode is possible within a gain-bandwidth of the solid-state gain element.

3. The apparatus of claim 1, wherein the optical amplifier is end-pumped by the diode-pumping.

4. The apparatus of claim 1, wherein the optical amplifier is a solid-state amplifier.

5. The apparatus of claim 1, where in the diode-pumping of the laser-resonator can be switched synchronously with the selective resonant coupling of the amplified stimulated emission.

6. The apparatus of claim 1, wherein the optical switch is an electro-optical switch.

7. The apparatus of claim 6, wherein the electro-optical switch includes a Pockels cell between first and second aligned polarizing elements.

8. The apparatus of claim 1, wherein the solid state gain-element is a neodymium-doped yttrium orthovanadate gain element.

9. A method for operating an optical apparatus, the apparatus including a diode-pumped passively Q-switched laser-resonator for delivering optical pulses, and a diode-pumped optical amplifier for amplifying the optical pulses, the optical amplifier generating forward and backward propagating amplified stimulated emission (ASE) in response to the diode-pumping thereof, the method comprising the steps of:
   turning off the diode-laser pumping of the laser;
   preventing backward propagating ASE from being coupled into the laser; then,
   resonantly coupling the backward-propagating ASE into the laser-resonator; and
   turning on diode-laser pumping of the laser wherein the ASE that is backward-propagated in the laser-resonator functions to seed the laser resonator to cause one or more optical pulses to be delivered from the laser resonator sooner than if the laser-resonator was not seeded.

10. The method of claim 9, further including the step of turning off the diode-laser pumping of the laser after a predetermined number of the one or more optical pulses has been delivered.

11. A method for operating an optical apparatus, the apparatus including a diode-pumped passively Q-switched laser-resonator for delivering optical pulses, and a diode-pumped optical amplifier for amplifying the optical pulses, the optical amplifier generating forward and backward propagating amplified stimulated emission (ASE) in response to the diode-pumping thereof, the method comprising the steps of:
   configuring the laser-resonator such that at a predetermined level of diode-pumping, delivery of pulses is not possible unless backward propagating ASE is resonantly coupled into the laser-resonator; and
   selectively resonantly coupling backward-propagating ASE into the laser-resonator, thereby causing at least one or more optical pulses to be delivered from the laser resonator during the resonant coupling of the ASE.

12. The method of claim 11, further including the step of preventing the backward-propagating ASE from being coupled into the laser resonator after a predetermined number of the at least one optical pulses has been delivered.

* * * * *